Nov. 29, 1960  R. E. SUMMERER  2,962,703
TRIPLE CONDITION TELL-TALE SYSTEMS
Filed Aug. 24, 1959
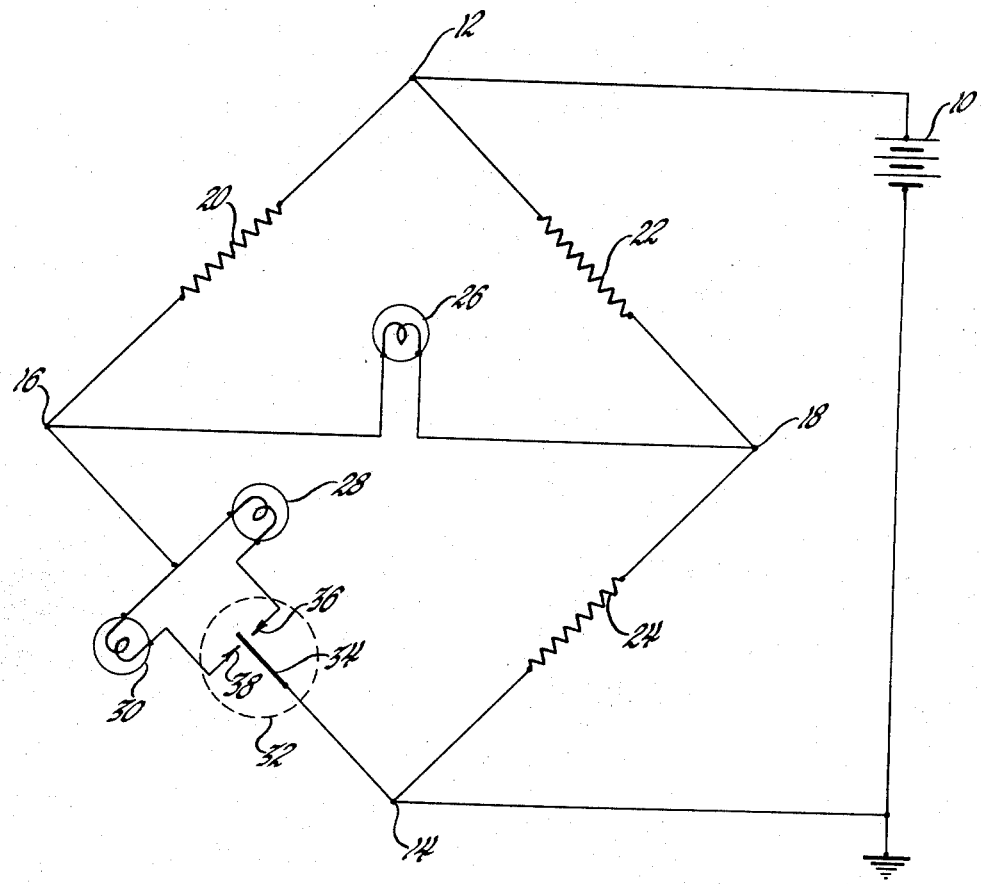
INVENTOR.
Ray E. Summerer
BY George E. Johnson
ATTORNEY

United States Patent Office 2,962,703
Patented Nov. 29, 1960

2,962,703

TRIPLE CONDITION TELL-TALE SYSTEMS

Ray E. Summerer, Grand Blanc, Mich., assignor to General Motors Corporation, Detroit, Mich., a corporation of Delaware Filed Aug. 24, 1959, Ser. No. 835,517

5 Claims. (Cl. 340—233)

This invention relates to indicating systems and more particularly to electrically operable tell-tale systems for positively indicating either of three conditions such as of temperature, pressure or liquid level obtaining in the operation of an automobile engine the latter being a setting given merely as an example.

In the operation of automobiles, tell-tale systems have heretofore been used to present positive information regarding failure of some aspects of engine operation. The information given at other times would be negative in nature in which case the indicating system itself could be at fault and could mislead an operator into believing that all aspects of engine operation are as they should be.

An object of the present invention is to provide a telltale or indicating system capable of imparting to an operator at all times a positive indication of the conditions obtaining in the operation of a device or apparatus such as an engine. Another object is to provide an indicating system which will indicate positively a normal operative condition as well as either of two abnormal operative conditions.

A feature of the present invention is a triple condition electrically operable indicating system including a normally unbalanced bridge circuit serving as a means of control of three indicating devices, one of the latter being normally operable when the bridge circuit is unbalanced and either of the other two devices being operable when an abnormal high or low condition obtains.

These and other important features of the invention will now be described in detail in the specification and then pointed out more particularly in the appended claims.

In the drawing, a battery is shown at 10 as a source of voltage. This source is connected across the input terminals 12 and 14 of a Wheatstone bridge circuit having two output terminals 16 and 18. Three arms of the bridge circuit include three predetermined resistances 20, 22 and 24. Three light bulbs, lamps, or indicating devices 26, 28 and 30 are arranged to be operated to show a normal temperature, a high temperature or a low temperature respectively has been attained. A fourth arm of the bridge circuit includes a thermostatically operated three-position bimetal switch diagrammatically illustrated at 32. It also includes the resistances or filaments of the two lamps 28 and 30. The switch 32 has a condition responsive or bimetal movable contact arm 34 and two fixed contacts 36 and 38. The resistance or filament of the lamp 26 is connected across the output terminals 16 and 18.

In operation for indicating engine coolant temperature, the bimetal contact 34 is subjected to the temperature of the coolant and if normal conditions obtain, the switch 32 will be open giving a difference in potential between the output terminals 16 and 18 thereby illuminating the lamp 26 which advantageously is made green in color.

If the engine temperature rises sufficiently to cause the contact 34 to engage the contact 36, then current will flow through the lamp 28 and illuminate the same. This lamp is made red in color to emphasize that the engine is unduly hot. When hot, the resistance of the lamp 28 is such as to balance the bridge circuit and the lamp 26 will go out.

If the engine temperature reduces unduly, the contacts 34 and 38 will close, the bridge circuit will be balanced and only the lamp 30 will be illuminated. This lamp could be white in color to enhance the indicated signal.

From this, it may be seen that the bridge circuit may be used to give three indications, normal, high and low, of engine temperature. Obviously, pressure, instead of temperature, may equally well be used to actuate a switch equivalent to the switch 32, a normal pressure maintaining the bridge unbalance. It is also clear that inductance or capacitance may be utilized in place of resistance values with a voltage source of either alternating or direct current being employed in the energizing of the bridge circuit and that the term "impedance" is applicable in describing each of the bridge resistances or lamp filaments shown.

I claim:

1. A triple condition electrically operable indicating system comprising a voltage source, a normally unbalanced bridge circuit, said voltage source being connected across input terminals of said bridge circuit, three arms of said bridge circuit each having a predetermined impedance, a fourth arm of said bridge circuit including a switch having three contacts, one of said contacts being relatively movable with respect to and into selective engagement with either of the other two contacts, condition responsive means for effecting said relative movement, three signal devices, two of said devices each having a controlling impedance in said fourth arm and being connected to one of said other two contacts, the third of said devices having a controlling impedance connected across the output terminals of the bridge, and said switch being normally open to unbalance the bridge.

2. A triple condition electrically operable indicating system comprising a voltage source, a normally unbalanced bridge circuit, said voltage source being connected across the input terminals of said bridge circuit, three arms of said bridge circuit each having a predetermined resistance, a fourth arm of said bridge circuit including a switch having three contacts, one of said contacts being relatively movable with respect to and into engagement with each of the other two contacts, condition responsive means for effecting said relative movement, three signal devices each of two of said devices having a controlling resistance in said fourth arm and connected to one of said other two contacts, the third of said devices having a controlling resistance connected across the output terminals of the bridge, and said switch being normally open to unbalance the bridge.

3. A triple temperature electrically operable indicating system comprising a voltage source, a normally unbalanced bridge circuit, said voltage source being connected across the input terminals of said bridge circuit, three arms of said bridge circuit each having a predetermined resistance, a fourth arm of said bridge circuit including a switch having three contacts, one of said contacts being relatively movable with respect to and into engagement with either of the other two contacts, thermostatic means for effecting said relative movement, three signal devices, each of two of said devices having a controlling resistance in said fourth arm and connected to one of said other two contacts, the third of said devices having a controlling resistance connected across the output terminals of the bridge, and said switch being normally open to unbalance the bridge.

4. A triple condition electrically operable indicating system comprising a voltage source, a normally unbalanced bridge circuit, said voltage source being connected across the input terminals of said bridge circuit, three arms of said bridge circuit each having a predetermined impedance, a fourth arm of said bridge circuit including a switch having two fixed contacts and a movable contact, condition responsive means for effecting movement of said movable contact, three signal devices, two of said devices each having a controlling impedance in said fourth arm and connected to one of said two fixed contacts, the third of said devices having a controlling impedance connected across the output terminals of the bridge, and said switch being normally open to unbalance the bridge.

5. A triple temperature electrically operable indicating system comprising a voltage source, a normally unbalanced bridge circuit, said voltage source being connected across the input terminals of said bridge circuit, three arms of said bridge circuit each having a predetermined resistance, a fourth arm of said bridge circuit including a normally open switch having two fixed contacts and a movable contact, temperature responsive means for effecting closure of said switch, three signal lamps of different colors, two of said lamps each having a controlling resistance in said fourth arm and connected to one of said fixed contacts, the third of said lamps having a controlling resistance connected across the output terminals of the bridge, and said switch being normally open to unbalance the bridge.

No references cited.